US012771840B2

(12) United States Patent
Cho et al.

(10) Patent No.: US 12,771,840 B2
(45) Date of Patent: Oct. 20, 2026

(54) METHODS AND SYSTEMS FOR SIGNALING AND PERFORMING SECONDARY TRANSFORMS

(71) Applicant: Tencent America LLC, Palo Alto, CA (US)

(72) Inventors: Yushin Cho, Palo Alto, CA (US); Xin Zhao, Palo Alto, CA (US); Liang Zhao, Palo Alto, CA (US); Madhu Peringassery Krishnan, Palo Alto, CA (US); Jing Ye, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 49 days.

(21) Appl. No.: 18/520,259

(22) Filed: Nov. 27, 2023

(65) Prior Publication Data

US 2025/0047849 A1 Feb. 6, 2025

Related U.S. Application Data

(60) Provisional application No. 63/530,461, filed on Aug. 2, 2023.

(51) Int. Cl.
*H04N 19/12* (2014.01)
*H04N 19/157* (2014.01)
(Continued)

(52) U.S. Cl.
CPC ........... *H04N 19/12* (2014.11); *H04N 19/157* (2014.11); *H04N 19/176* (2014.11); *H04N 19/70* (2014.11)

(58) Field of Classification Search
CPC .... H04N 19/12; H04N 19/157; H04N 19/176; H04N 19/70
See application file for complete search history.

(56) References Cited

U.S. PATENT DOCUMENTS

2016/0373743 A1 12/2016 Zhao et al.
2020/0137388 A1 4/2020 Kanoh et al.
(Continued)

FOREIGN PATENT DOCUMENTS

WO WO 2023/131299 A1 7/2023

OTHER PUBLICATIONS

Tencent Technology, ISR/WO, PCT/US2023/081945, Mar. 13, 2024, 21 pgs.

*Primary Examiner* — Nam D Pham
(74) *Attorney, Agent, or Firm* — Morgan, Lewis & Bockius LLP

(57) ABSTRACT

Methods and systems for encoding and decoding video are described. In one aspect, a method of video decoding includes receiving video data that includes a first block and a first syntax element from a video bitstream. The method also includes determining a secondary transform kernel type value for the first block based on the first syntax element. In accordance with a determination that the secondary transform kernel type has a first value, a secondary transform set identifier is determined based on a second syntax element from the video bitstream, and an inverse secondary transform is performed on the first block using the determined secondary transform kernel type and determined secondary transform set identifier. In accordance with a determination that the secondary transform kernel type has a second value, the inverse secondary transform is not performed on the first block.

20 Claims, 8 Drawing Sheets

(51) Int. Cl.
*H04N 19/176* (2014.01)
*H04N 19/70* (2014.01)

(56) References Cited

U.S. PATENT DOCUMENTS

| | | | | |
|---|---|---|---|---|
| 2020/0244956 | A1* | 7/2020 | Lee | H04N 19/52 |
| 2020/0304782 | A1 | 9/2020 | Zhao et al. | |
| 2021/0014505 | A1* | 1/2021 | Wang | H04N 19/70 |
| 2021/0084301 | A1 | 3/2021 | Siekmann et al. | |
| 2021/0203969 | A1 | 7/2021 | Salehifar et al. | |
| 2021/0297700 | A1 | 9/2021 | Koo et al. | |
| 2022/0038744 | A1 | 2/2022 | Nam et al. | |
| 2022/0150510 | A1 | 5/2022 | Krishnan et al. | |
| 2023/0037443 | A1* | 2/2023 | Zhang | H04N 19/12 |

* cited by examiner

METHODS AND SYSTEMS FOR SIGNALING AND PERFORMING SECONDARY TRANSFORMS

RELATED APPLICATIONS

This application claims priority to U.S. Provisional Patent Application No. 63/530,461, entitled "Signaling Method for Transform," filed Aug. 2, 2023, which is hereby incorporated by reference in its entirety.

TECHNICAL FIELD

The disclosed embodiments relate generally to image and video coding and compression, including but not limited to systems and methods for signaling and performing secondary transforms.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

Video codecs generally operate on pixel blocks. For example, each pixel block is processed in a predictive-transform coding scheme, where the prediction comes from either intra frame reference pixels, inter frame motion compensation, or some combination thereof. The residuals from the prediction may undergo a 2-D transform to remove spatial correlations and then the transform coefficients may be quantized. Both the prediction syntax elements and the quantized transform coefficient indexes can then be entropy coded using arithmetic coding. Some video codecs have started to use directional or non-separable primary and secondary image transforms to further improve the compression efficiency (e.g., due to remaining correlations among transformed coefficients after a primary transform).

In some approaches, the parameters of the secondary transform are implicitly derived (e.g., based on the primary transform parameters). However, it may be beneficial to signal at least a subset of the secondary transform parameters as it allows for the most accurate and/or precise secondary transform to be applied, which improves coding efficiency. Signaling the secondary transform parameters may increase coding overhead. However, as described herein, the coding overhead can be reduced/minimized (e.g., by signaling the kernel type first and forgoing signaling the transform set ID if the kernel type signaling indicates that a secondary transform is not used).

In accordance with some embodiments, a method of video encoding is provided. The method includes (i) receiving video data comprising a plurality of blocks, including a first block; (ii) determining a secondary transform kernel type value for the first block; (iii) transmitting a first syntax element in a video bitstream, the first syntax element indicating the secondary transform kernel type value: (iv) in accordance with a determination that the secondary transform kernel type has a first value: (a) determining a secondary transform set identifier: (b) transmitting a second syntax element in the video bitstream, the second syntax element indicating the secondary transform set identifier; and (c) performing a secondary transform on the first block using the determined secondary transform kernel type and determined secondary transform set identifier; and (v) in accordance with a determination that the secondary transform kernel type has a second value: (a) forgoing transmitting the second syntax element; and (b) forgoing performing the secondary transform on the first block.

In accordance with some embodiments, a method of video decoding is provided. The method includes (i) receiving video data comprising a plurality of blocks, including a first block, and a first syntax element from a video bitstream; (ii) determining a secondary transform kernel type value for the first block based on the first syntax element; (iii) in accordance with a determination that the secondary transform kernel type has a first value: (a) determining a secondary transform set identifier based on a second syntax element from the video bitstream; and (b) performing an inverse secondary transform on the first block using the determined secondary transform kernel type and determined secondary transform set identifier, the inverse secondary transform corresponding to a secondary transform performed during encoding of the video data; and (iv) in accordance with a determination that the secondary transform kernel type has a second value, forgoing performing the inverse secondary transform on the first block.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes systems and methods of signaling primary and secondary transforms. In some approaches, the parameters of a secondary transform are implicitly derived (e.g., based on coding context such as the parameters of the primary transform). As described in more detail below, in some embodiments, secondary transform information is signaled (e.g., in the video bitstream), which can improve coding efficiency (e.g., allowing the most accurate and precise secondary transform to be used). Additionally, some embodiments described herein reduce (e.g., minimize) coding overhead by signaling a secondary transform kernel type before signaling the transform set identifier. For example, the system forgoes signaling the transform set identifier in response to the secondary transform kernel type indicating that a secondary transform is not used.

Example Systems and Devices

Figure 1:
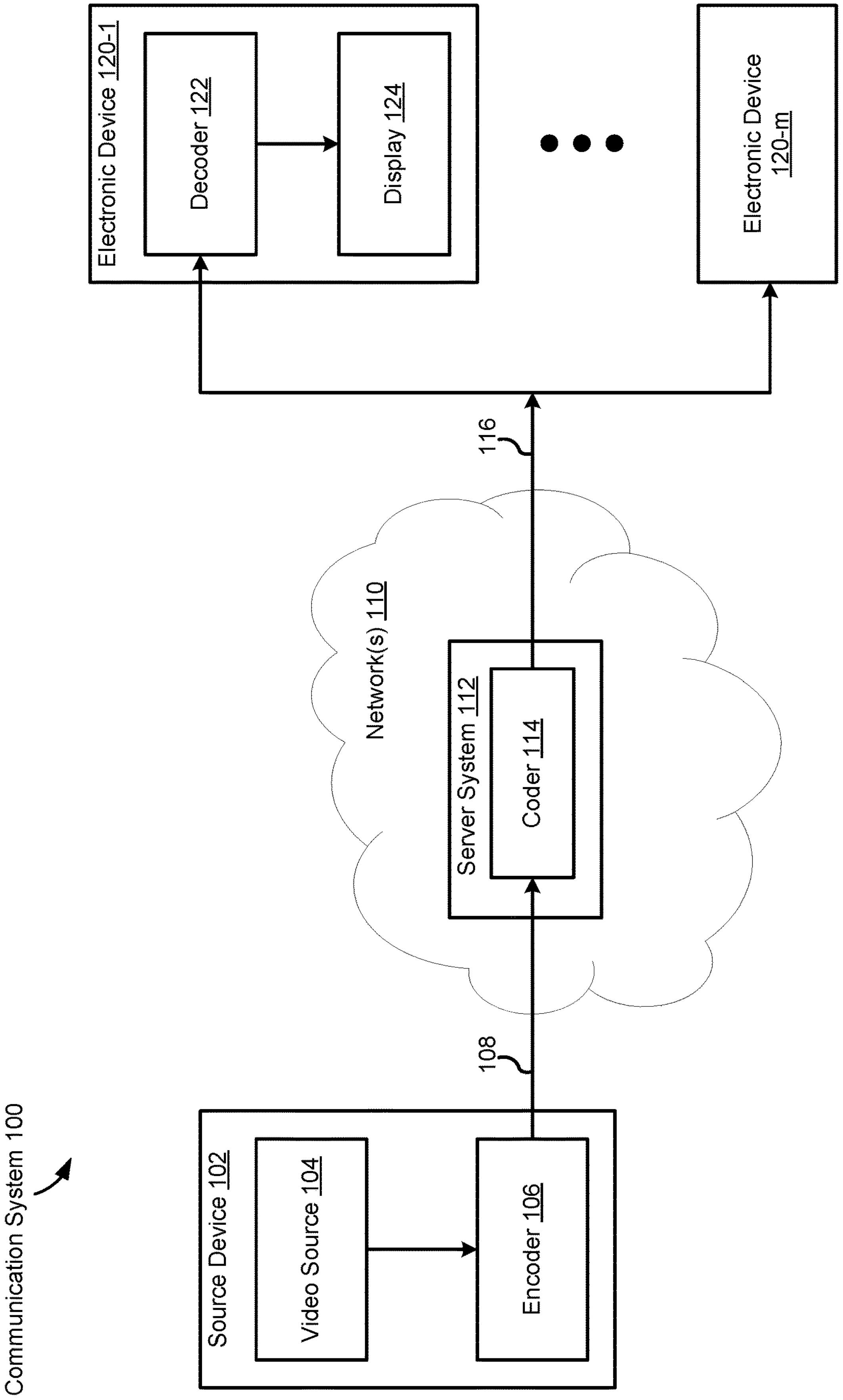
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
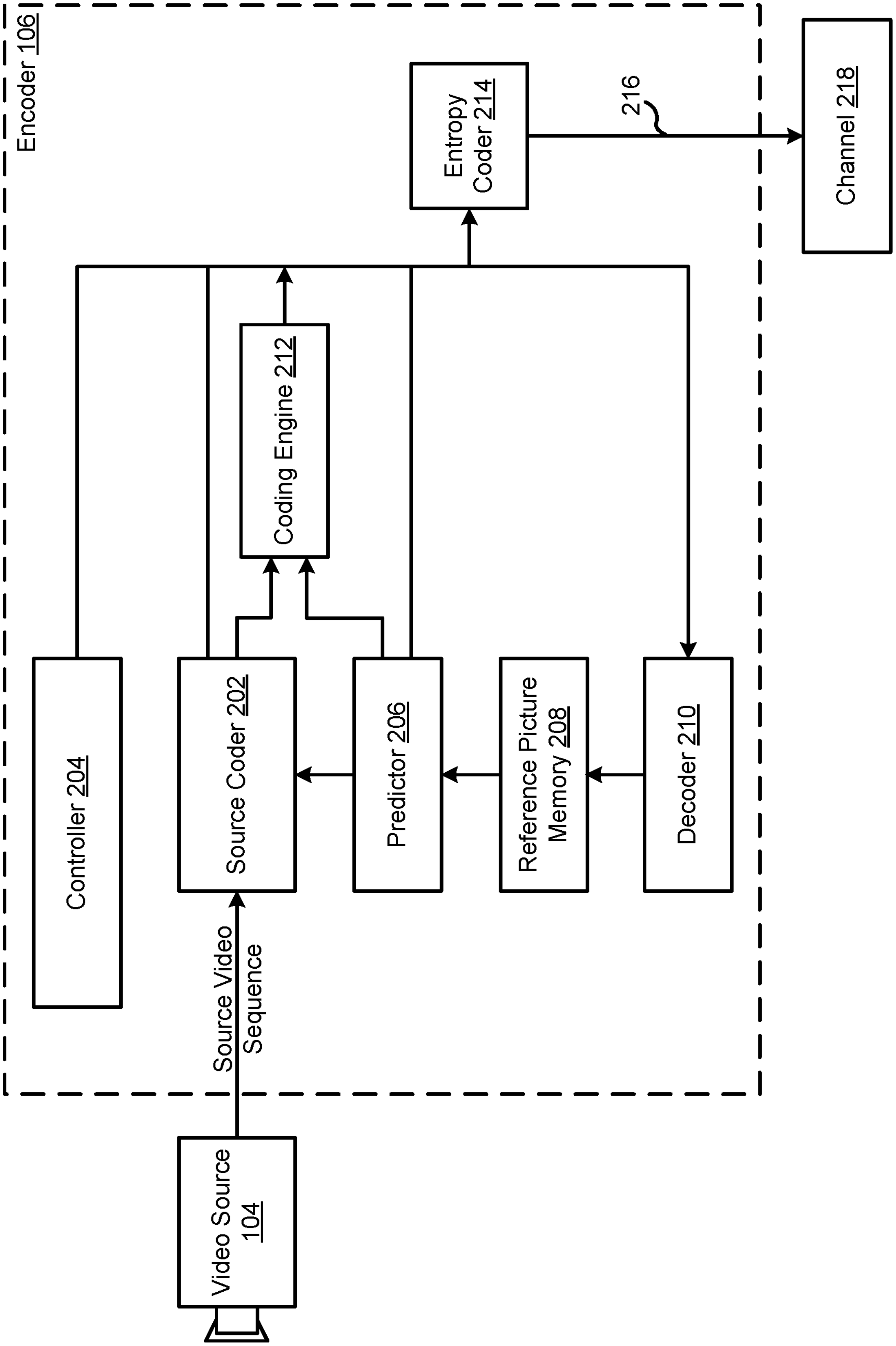
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
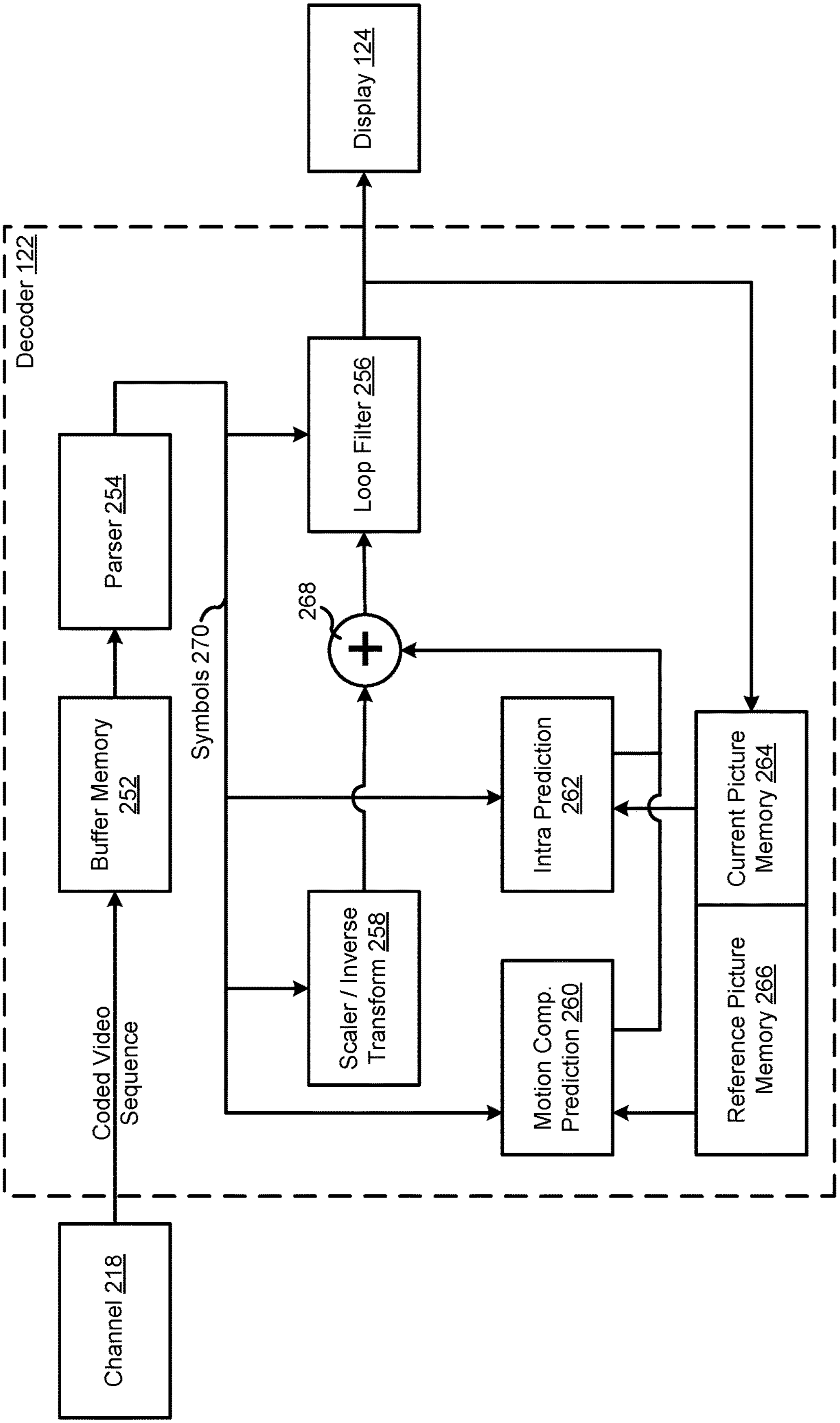
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as one or more integrated circuits and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block: that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
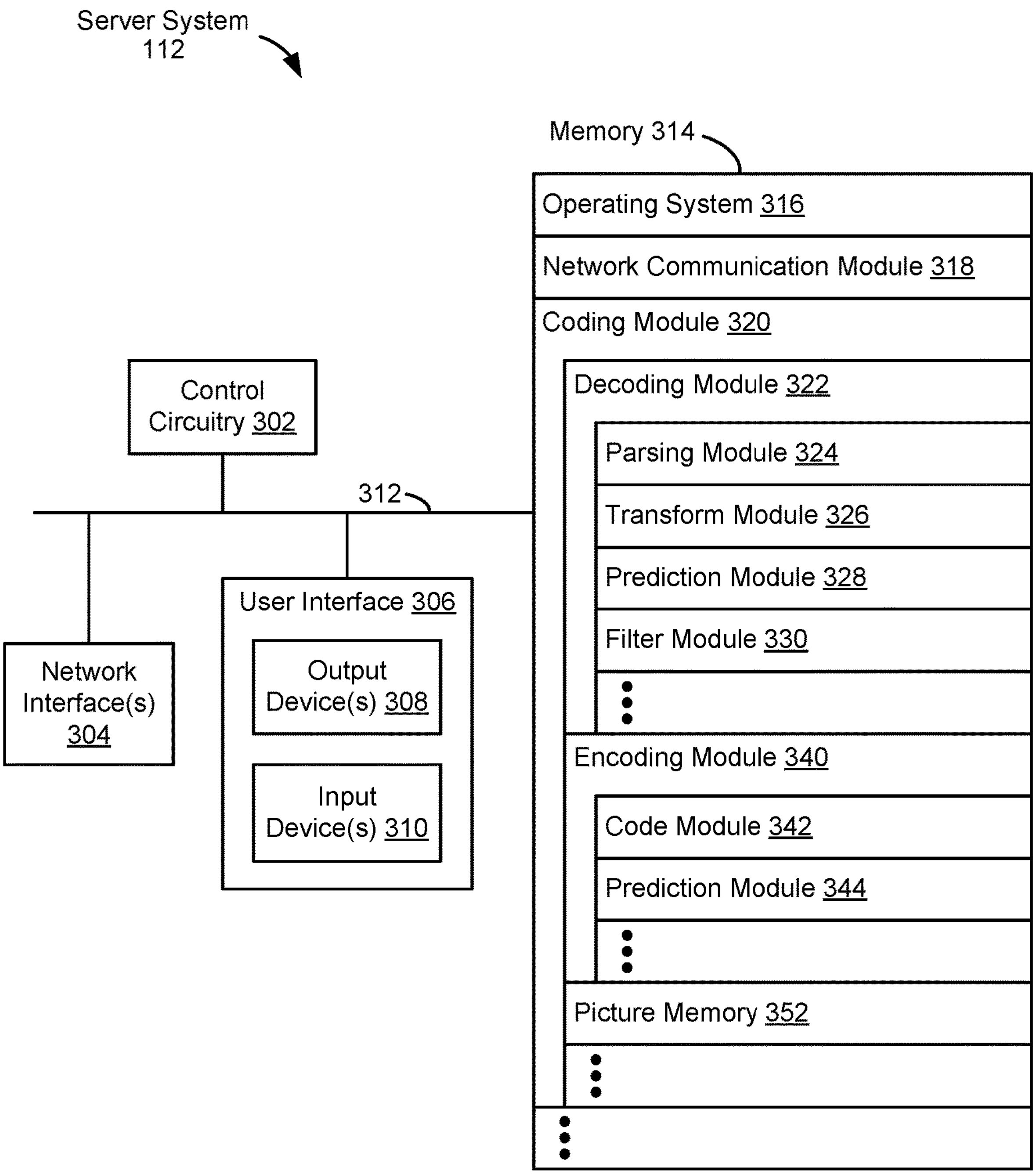
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Processes and Techniques

As discussed above, video codecs generally include multiple techniques: intra/inter prediction, image transform, quantization, coefficient coding, entropy coding and/or in-loop filtering. In particular, it is beneficial to decorrelate the prediction error (e.g., the residual) signals. The present disclosure describes techniques for signaling and applying secondary transforms. The primary and/or secondary transform signaling may be implicit or explicit (e.g., explicitly signaled in a bitstream). The techniques described herein may be used separately or combined in any order. Further, each of the techniques may be implemented by processing circuitry (e.g., one or more processors or one or more integrated circuits).

Figure 4:
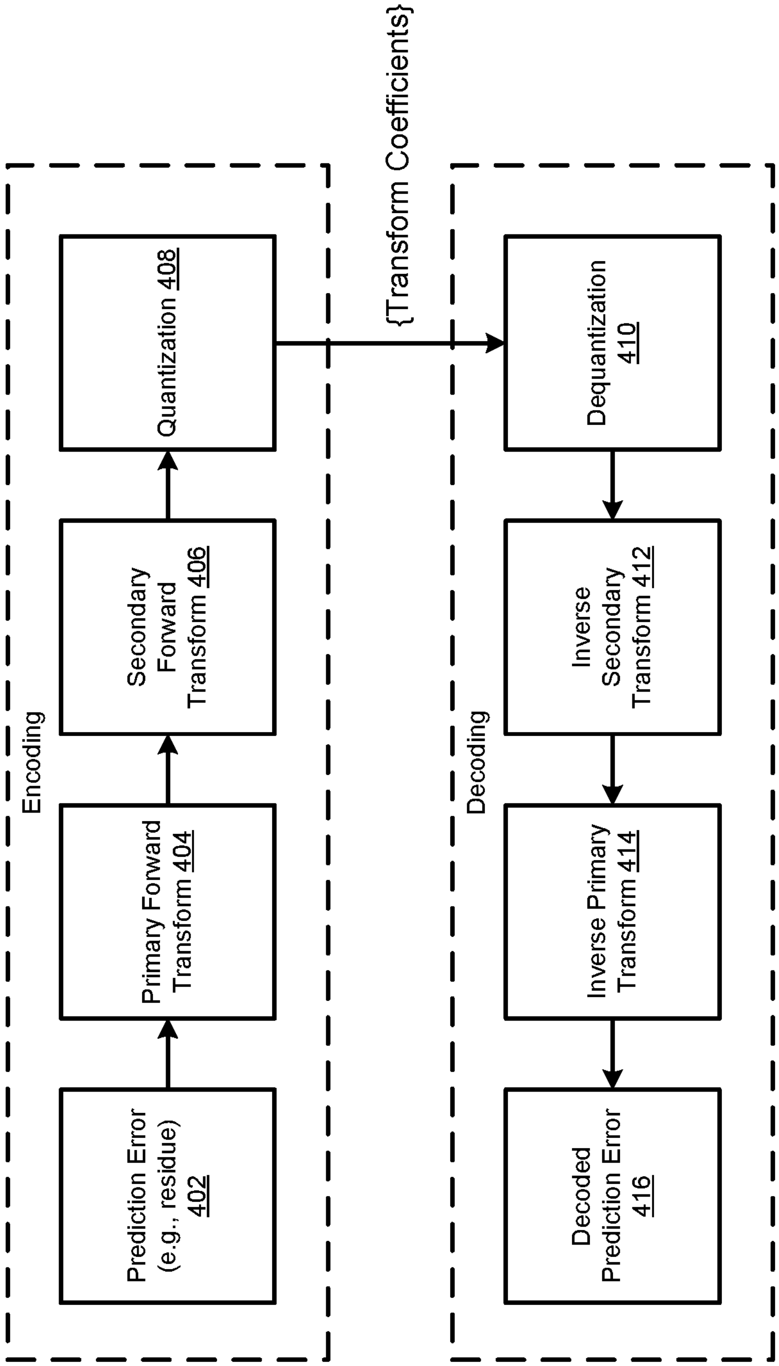
FIG. 4 is a block diagram illustrating an example encoding and decoding process in accordance with some embodiments.

The secondary transform may be applied between a primary transform component and a quantization component, as illustrated in FIG. 4. For example, the forward secondary transform is applied between the primary forward transform and quantization components, and the inverse secondary transform is applied between the dequantization and primary inverse transform components.

FIG. 4 is a block diagram illustrating an example encoding and decoding process in accordance with some embodiments. As illustrated in FIG. 4, a prediction error 402 (e.g., a residue) is transformed and then quantized to generate transform coefficients. A primary forward transform 404 (also sometimes referred to as a primary transform) is applied to the prediction error 402. In accordance with some embodiments, a secondary forward transform 406 (also sometimes referred to as a secondary transform) is applied to the output of the primary forward transform 404. A quantization 408 is applied to the output of the secondary forward transform 406 to generate the transform coefficients. In some embodiments, the transform coefficients are signaled in a video bitstream.

A dequantization 410 is applied to the transform coefficients (e.g., at a decoder). An inverse secondary transform 412 is applied to the output of the dequantization 410 (e.g., to reverse the effects of the secondary forward transform 406). An inverse primary transform 414 is applied to the output of the inverse secondary transform 412 (e.g., to reverse the effects of the primary forward transform 404). In this way, a decoded prediction error 416 is obtained from the transform coefficients.

As used herein, a primary and/or secondary transform set (sometimes referred to as a 'transform set' or a 'set') refers to a group of transform kernels. For example, the optimal transform set may be determined (during an encoding process) for each transform block. A secondary transform set may be identified during the encoding process if the encoder (or transcoder) has determined that a secondary transform should be applied.

As used herein, a primary and/or secondary transform kernel type (sometimes referred to as a 'kernel type') refers to options of transform kernel types within each transform set. For example, a primary and/or secondary transform set may include one or more primary and/or secondary transform kernel types. As an example, a set and kernel hierarchy may include 7 sets, in which each set has 4 kernel types. In this example, one of the kernel types may indicate that there is no primary and/or secondary transform. For example, among 4 kernel type indices (0, 1, 2, and 3) the system may define the kernel type index 0 to indicate that there is no primary and/or secondary transform, hence the transform set does not be signaled. An encoder component may choose the transform set identifier (ID) and the kernel type identifier (ID).

As used herein, a set context index (sometimes referred to as a 'set context') refers to a (nominal) set context index that may be derived and predefined (e.g., as part of standardization) from coding context. The 'coding context' may include information about a previously-coded mode (such as an intra or inter prediction mode), a primary transform type, a coding block size, and/or a transform block size.

As used herein, 'context_to_probable_set' refers to a predefined mapping between a set context index and a probable transform set ID (e.g., a most probable transform set ID). For example, one or more most probable sets may be identified for a given coding context, where the coding context may be defined by the video standard. As an example, as shown below in Code Snippet 1, 12 example intra prediction modes are mapped to a set ID, which has a range of [0, . . . , 6] (e.g., a 12-symbols-to-7-symbols mapping).

Code Snippet 1 below illustrates an example context_to_probable_set[i], with an index derived from an example context grouping (e.g., composed of example intra prediction modes). In the example of Code Snippet 1, two intra prediction modes (INTRA_PRED_1 and INTRA_PRED_2) are in a same group that maps to the same set ID 1.

Code Snippet 1 - Example Mapping Table

```
context_to_probable_set[12] = {
0,  // INTRA_PRED_0
1,  // INTRA_PRED_1
1,  // INTRA_PRED_2
2,  // INTRA_PRED_3
3,  // INTRA_PRED_4
4,  // INTRA_PRED_5
4,  // INTRA_PRED_6
5,  // INTRA_PRED_7
5,  // INTRA_PRED_8
6,  // INTRA_PRED_9
1,  // INTRA_PRED_10
1,  // INTRA_PRED_11
};
```

The index for the mapping table in Code Snippet 1 may be an intra prediction ID [0, . . . , 11] as defined and shown below in Code Snippet 2. The range of the index may vary, for example, based on which coding context the context_to_probable_set mapping table uses. For example, Code Snippet 2 illustrates an example coding context that comes from example intra prediction modes. This coding context may form an index for a mapping function or table (e.g., context_to_probable_set[i]) to derive the set context, which may determine the most probable transform set for each unique coding context.

Code Snippet 2 - Example Intra Prediction ID

```
enum {
INTRA_PRED_0 // e.g., DC_PRED
INTRA_PRED_1 // e.g., V_PRED
INTRA_PRED_2 // e.g., H_PRED
INTRA_PRED_3 // e.g., D45_PRED
INTRA_PRED_4 // e.g., D135_PRED
INTRA_PRED_5 // e.g., D113_PRED
INTRA_PRED_6 // e.g., D157_PRED
INTRA_PRED_7 // e.g., D203_PRED
INTRA_PRED_8 // e.g., D67_PRED
INTRA_PRED_9 // e.g., SMOOTH_PRED
INTRA_PRED_10 // e.g., SMOOTH_V_PRED
INTRA_PRED_11 // e.g., SMOOTH_H_PRED
} PREDICTION_MODE
```

In some embodiments, an intra secondary transform (IST) coding tool is used to implicitly derive a secondary transform set based on the context of intra prediction directions (e.g., an explicitly signal the kernel type within a set). Table 1 below illustrates an example mapping from intra prediction mode and primary transform type to an (IST) index.

TABLE 1

Example Mapping from Intra Mode and Primary Transform to IST

| intra prediction mode | primary transform type | IST set index |
|---|---|---|
| DC_PRED | DCT only | 0 |
| V_PRED | | 1 |
| H_PRED | | 1 |
| D45_PRED | | 2 |
| D135_PRED | | 3 |
| D113_PRED | | 4 |
| D157_PRED | | 4 |
| D203_PRED | | 5 |
| D67_PRED | | 5 |
| SMOOTH | | 6 |

TABLE 1-continued

Example Mapping from Intra Mode and Primary Transform to IST

| intra prediction mode | primary transform type | IST set index |
|---|---|---|
| SMOOTH_V | | 1 |
| SMOOTH_H | | 1 |
| DC_PRED | ADST only | 7 |
| V_PRED | | 8 |
| H_PRED | | 8 |
| D45_PRED | | 9 |
| D135_PRED | | 10 |
| D113_PRED | | 11 |
| D157_PRED | | 11 |
| D203_PRED | | 12 |
| D67_PRED | | 12 |
| SMOOTH | | 13 |
| SMOOTH_V | | 8 |
| SMOOTH_H | | 8 |

In some embodiments, the secondary transform set is signaled explicitly. Explicitly signaling the secondary transform set allows for any secondary transform set to be selected for a block regardless of the intra prediction mode being applied. Code Snippet 3 below illustrates an example transform type syntax.

Code Snippet 3—Example Transform Type Syntax

```
transform_type( x4, y4, txSz) {                                              Type
. . .
  } else {
  intra_tx_type                                                              S0
  if ( set == TX_SET_INTRA_1 )
    TxType = Tx_Type_Intra_inv_Set1[ intra_tx_type ]
  else
    TxType = Tx_Type_Intra_Inv_Set2[ intra_tx_type ]
  if ((TxType == DCT_DCT || TxType == ADST_ADST) &&
  !(use_filter_intra) && (y_mode < PAETH_PRED) && !(tx_depth)) {
    stx_type                                                                 S0
    if (stx_type)
      stx_set                                                                S0
  }
  . . .
}
```

In the example of Code Snippet 3, the stx_set parameter is inserted after the stx_type parameter (e.g., because when stx_type is set to a particular value (e.g., 0) there is no secondary transform and thus stx_set need not be coded, signaled, or parsed). In some embodiments, there are 14 secondary transform sets. In some embodiments, the secondary transform sets are dependent on primary transform types (e.g., 2 primary transform types). Thus, in some embodiments, 7 different sets need to be signaled for a primary transform type. In some embodiments, a probabilistic context is selected for each set. In some embodiments, the probabilistic context is derived from the intra predication modes.

Code Snippet 4 below illustrates an example secondary transform definition.

Code Snippet 4 - Example secondary transform definition

```
// Intra Secondary Transform
#define IST_SET_SIZE 14 // IST kernel set size
#if CONFIG_IST_SET_FLAG // Number of directional groups in IST
kernels
#define IST_DIR_SIZE 7 // (IST_SET_SIZE >> 1)
#endif // CONFIG_IST_SET_FLAG
```

Code Snippet 5 below illustrates example code for reading a secondary transform type.

Code Snippet 5 - Example Function for Reading Secondary Transform

```
void av1_read_sec_tx_type( ) {
uint8_t intra_mode = mbmi -> mode;
uint8_t stx_set_ctx = stx_transpose_mapping [intra_mode];
assert(stx_set_ctx < IST_DIR_SIZE);
uint16_t stx_set_flag = aom_read_symbol (r, ec_ctx -> stx_set_cdf
[stx_set_ctx], IST_DIR_SIZE, ACCT_INFO("stx_set_flag"));
assert (stx_set_flag < IST_DIR_SIZE);
...
}
```

In some embodiments, the stx_set_ctx parameter is derived from an intra prediction mode of the transform block being decoded. Code Snippet 6 below illustrates another example secondary transform mapping array (e.g., a mapping of intra modes to IST kernel set).

Code Snippet 6 - Example Secondary Transform Mapping Array

```
static const uint8_t stx_transpose_mapping [INTRA_MODES - 1] = {
// Array index:
0, // DC_PRED
1, // V_PRED
1, // H_PRED
2, // D45_PRED
3, // D135_PRED
4, // D113_PRED
4, // D157_PRED
5, // D203_PRED
6,   // SMOOTH_PRED
1, // SMOOTH_V_PRED
1, // SMOOTH_H_PRED
};
```

In some embodiments, secondary transforms are enabled only for a subset of intra modes (e.g., intra modes less than PEATH_PRED). In this way, the array size for stx_transpose_mapping is set as INTRA_MODES−1.

A cumulative distribution function (CDF) may be used to represent the probability that a random variable may take a value that is less than or equal to a particular threshold value. For example, a CDF for a video codec may represent the probability times 32768 that a symbol has value less than or equal to a given level. An example CDF with an alphabet size of 7 is illustrated in Code Snippet 7 below.

Code Snippet 7 - Example CDF

```
static const aom_cdf_prob
default_stx_set_cdf[IST_DIR_SIZE][CDF_SIZE(IST_DIR_SIZE)] =
{
{ AOM_CDF7(32744, 32748, 32756, 32760, 32764) },
{ AOM_CDF7(4, 32748, 32752, 32756, 32760, 32764) },
{ AOM_CDF7(4, 8, 32752, 32756, 32760, 32764) },
{ AOM_CDF7(4, 8, 12, 32756, 32760, 32764) },
```

-continued

Code Snippet 7 - Example CDF

```
{ AOM_CDF7(4, 8, 12, 16, 32760, 32764) },
{ AOM_CDF7(4, 8, 12, 16, 20, 32764) },
{ AOM_CDF7(4, 8, 12, 16, 20, 24) },
};
```

In Code Snippet 7, the IST_DIR_SIZE may be defined as 7 and the size of the CDF table is 112 bytes (e.g., 7 contexts*8 (7 symbols+1 counter)*2 (bytes per number)). For example, the number of stx_set_ctx contexts may be 7, as defined by #define IST_DIR_SIZE 7 in Code Snippet 4 above. In some embodiments, the CDF probability model is set such that the most probable set symbol has the highest possible range size. For example, the highest possible range size of 2^15−6*4 for a CDF model with a maximum range of 2^15, with 6 for the number of less probable set symbols, and 4 for a minimum CDF range. In some embodiments, a minimum range is defined as (#define EC_MIN_PROB 4). In this way, the probability represented by the CDF model is (2^15−(6*4))/2^15, which is approximately 0.9994.

Code Snippet 8 below illustrates an example configuration for a secondary transform.

Code Snippet 8 - Example Secondary Transform Configuration

```
#if CONFIG_IST_SET_FLAG
  if (stx_flag > 0) {
    uint8_t is_adst_adst = get_primary_tx_type(*tx_type) ==
      ADST_ADST ? 1 : 0;
    uint8_t intra_mode = mbmi->mode;
    uint8_t stx_set_ctx = stx_transpose_mapping[intra_mode];
    assert(stx_set_ctx < IST_DIR_SIZE);
    uint16_t stx_set_flag = aom_read_symbol(r, ec_ctx-
      >stx_set_cdf[stx_set_ctx], IST_DIR_SIZE,
      ACCT_INFO("stx_set_flag"));
    assert(stx_set_flag < IST_DIR_SIZE);
    if (is_adst_adst) stx_set_flag += IST_DIR_SIZE;
    *tx_type |= (stx_set_flag << (4 + 2));
  }
#endif // CONFIG_IST_SET_FLAG
```

Figure 5A:
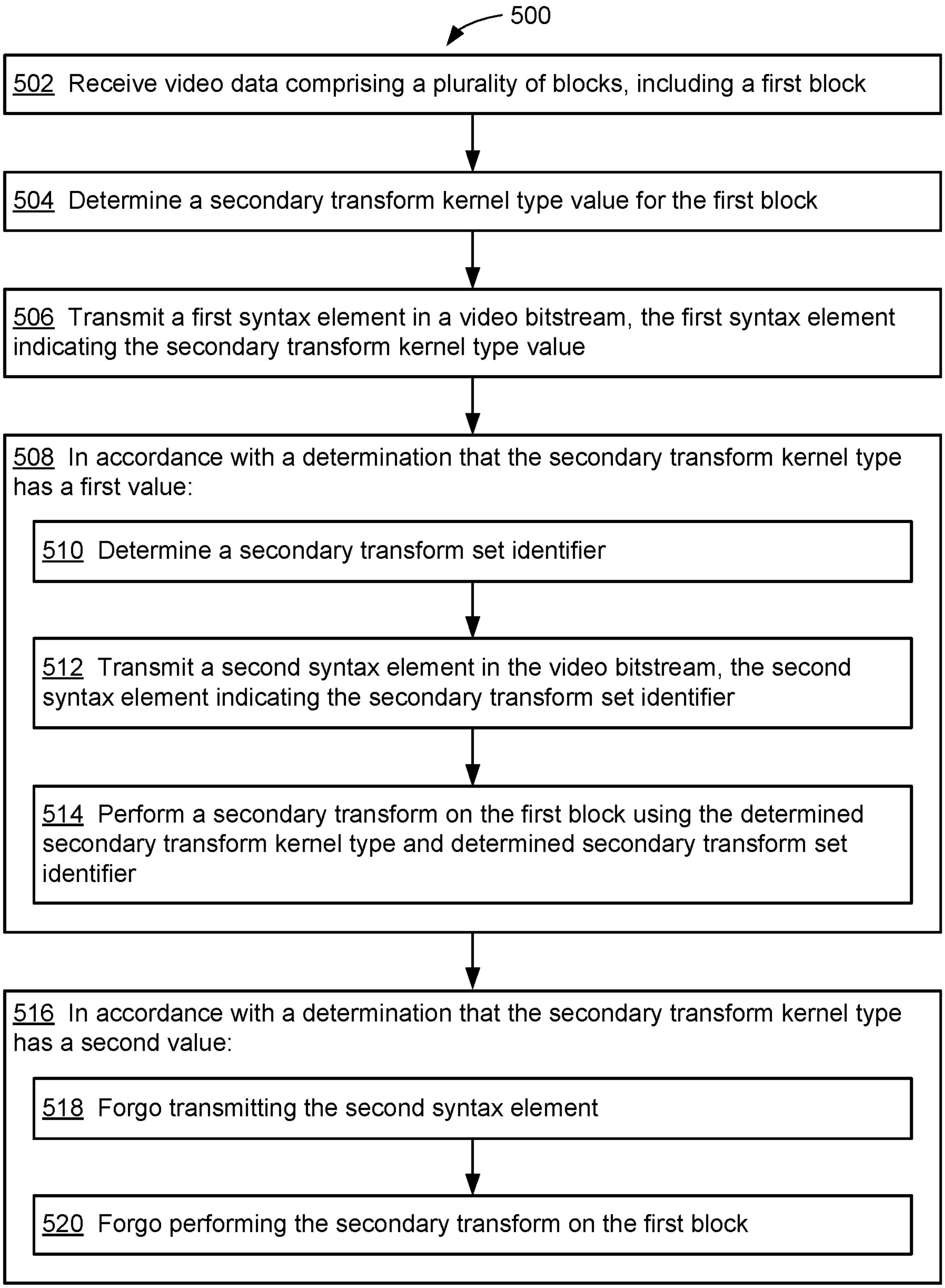
FIG. 5A is a flow diagram illustrating an example method of encoding video in accordance with some embodiments.

FIG. 5A is a flow diagram illustrating a method 500 of encoding video in accordance with some embodiments. The method 500 may be performed at a computing system (e.g., the server system 112, the source device 102, or the electronic device 120) having control circuitry and memory storing instructions for execution by the control circuitry. In some embodiments, the method 500 is performed by executing instructions stored in the memory (e.g., the memory 314) of the computing system.

The system receives (502) video data comprising a plurality of blocks, including a first block (e.g., from a video source 104). The system determines (504) a secondary transform kernel type value for the first block. The system transmits (506) a first syntax element in a video bitstream, the first syntax element indicating the secondary transform kernel type value. In some embodiments, the system performs a primary transform on the first block (e.g., the primary forward transform 404).

In accordance with a determination that the secondary transform kernel type has a first value (508): the system determines (510) a secondary transform set identifier, transmits (512) a second syntax element in the video bitstream, the second syntax element indicating the secondary transform set identifier, and performs (514) a secondary transform (e.g., the secondary forward transform 406) on the first block using the determined secondary transform kernel type and determined secondary transform set identifier. For example, the system performs the secondary transform on the output of a primary transform applied to the first block.

In accordance with a determination that the secondary transform kernel type has a second value (516): the system forgoes (518) transmitting the second syntax element, and forgoes (520) performing the secondary transform on the first block.

Figure 5B:
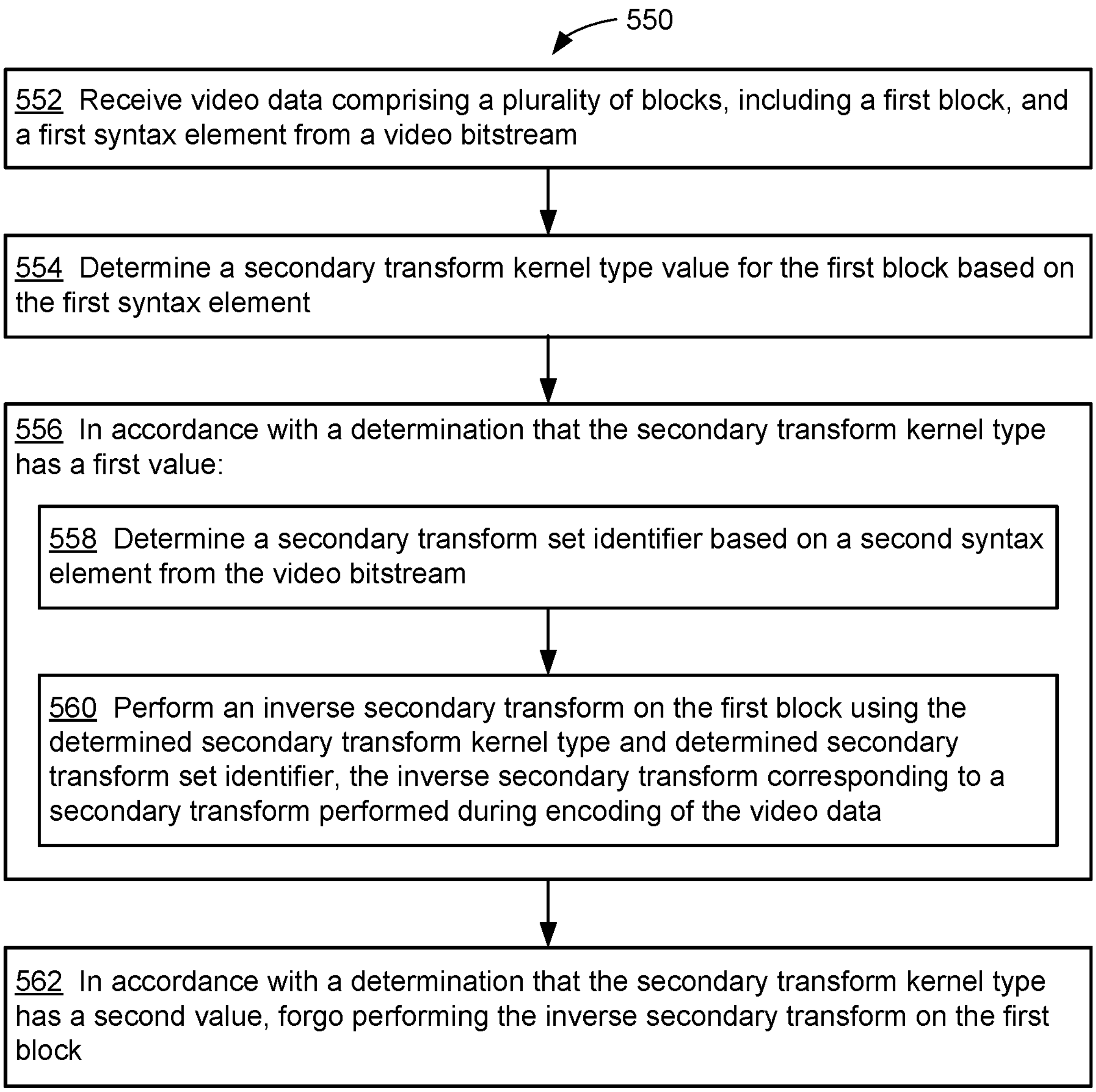
FIG. 5B is a flow diagram illustrating an example method of decoding video in accordance with some embodiments.

FIG. 5B is a flow diagram illustrating a method 550 of decoding video in accordance with some embodiments. The method 550 may be performed at a computing system (e.g., the server system 112, the source device 102, or the electronic device 120) having control circuitry and memory storing instructions for execution by the control circuitry. In some embodiments, the method 550 is performed by executing instructions stored in the memory (e.g., the memory 314) of the computing system.

The system receives (552) video data comprising a plurality of blocks, including a first block, and a first syntax element (e.g., indicating stx_flag) from a video bitstream (e.g., a coded video sequence). The system determines (554) a secondary transform kernel type value for the first block based on the first syntax element.

In accordance with a determination that the secondary transform kernel type has a first value (556): the system determines (558) a secondary transform set identifier based on a second syntax element (e.g., indicating stx_set_flag) from the video bitstream, and performs (560) an inverse secondary transform (e.g., the inverse secondary transform 412) on the first block using the determined secondary transform kernel type and determined secondary transform set identifier, the inverse secondary transform corresponding to a secondary transform (e.g., the secondary forward transform 406) performed during encoding of the video data.

In accordance with a determination that the secondary transform kernel type has a second value, the system forgoes (562) performing the inverse secondary transform on the first block.

Although FIGS. 5A and 5B illustrates a number of logical stages in particular orders, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

In some embodiments, a chosen transform set and/or a kernel type is signaled (e.g., within the set) by encoding a primary and/or secondary transform set ID and/or a secondary kernel type. For example, a decoding approach includes determining a secondary transform kernel type value for the first block based on the first syntax element. In this example, in response to the secondary transform kernel type having a first value (e.g., non-zero), a secondary transform set identifier is determined based on a second syntax element from the video bitstream and an inverse secondary transform is performed on the first block using the determined secondary transform kernel type and determined secondary transform set identifier.

In some embodiments, the kernel type is signaled first, then the transform set is signaled. In some embodiments, the primary transform types include at least one non-separable transform. In some embodiments, the secondary transform types include at least one non-separable transform. In some embodiments, the transform set includes a mixture of primary-only and primary-plus-secondary transform combination types. In some embodiments, the kernel type for primary transform and secondary transform are jointly signaled. In some embodiments, the kernel set for primary transform and secondary transform are jointly signaled. In some embodiments, signaling the kernel type also signals whether the primary and/or secondary transform is used. In some embodiments, if kernel type signals that primary and/or secondary transform is disabled, the transform set ID is not signaled.

In some embodiments, a flag is first signaled to indicate whether a primary and/or secondary transform is applied, when the flag is signaled with a value indicating primary and/or secondary transform is applied, the kernel type is further signaled to indicate which one of the transform kernel is used and this kernel type does not include the option of not applying primary and/or secondary transform. In some embodiments, the method of mapping set context to transform set ID is derived from any possible coding context. In some embodiments, the coding context includes any possible combination of previously coded mode or combination of them, such as intra prediction mode, or primary transform type, or primary transform set ID, or secondary transform type, or secondary transform set ID, or coding block size, or transform block size.

In some embodiments, a grouping of coding texts is predefined to form an index for the mapping function or table context_to_probable_set. In some embodiments, the most probable set is derived from the coding context, which is predefined and implemented in a mapping function or table. In some embodiments, the specific set of primary transform and secondary transform kernel types is designed or chosen from already available transform kernels, such that it works best, e.g., decorrelate best or best video compression efficiency, for a certain group of coding contexts. In some embodiments, for each predefined group of coding contexts, there is only one or a subgroup of transform set that can be applicable for the current block.

In some embodiments, the signaling of a set ID is performed by an arithmetic coding. In some embodiments, the default or initial probability model (e.g., CDF) for arithmetic coding of a most probable secondary transform set ID is set as nearly 100% probability or as high allowed as possible in the video coding system. In some embodiments, the default or initial probability model (e.g., CDF) for arithmetic coding of a remaining less probable secondary transform set IDs is set as nearly 0% probability or as low allowed as possible in the video coding system. The nearly 0% probability is achieved by associating the minimum range value (e.g., 4) for the symbol representing one of these remaining less probable secondary transform set IDs. In various embodiments, the default probability model (e.g., CDF) is adaptive or nonadaptive. In some embodiments, if the video coding system is able to choose adaptive or nonadaptive mode for the entropy coding of the set symbol, the nonadaptive mode is chosen, e.g., to spend the least possible number of bits to code the set symbol.

In some embodiments, the signaling of set ID can be performed by a variable length coding (a.k.a. VLC) or Huffman coding. In some embodiments, the codeword length of the most probable transform set is the shortest possible. In some embodiments, the codeword length of the less probable transform set is longer than that of most probable set.

Figure 6:
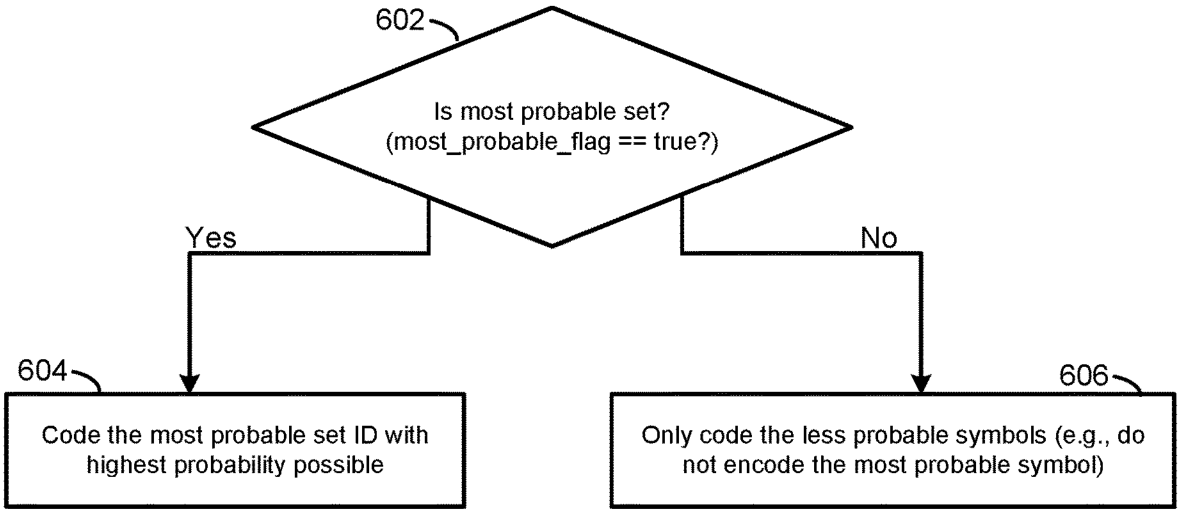
FIG. 6 is a flow diagram illustrating an example coding process in accordance with some embodiments.

In some embodiments, signaling the secondary transform starts with a binary flag (e.g., most probable_flag), which tells whether the set is most probable or not. For example, FIG. 6 shows a check (602) whether the set is the most probable set. As shown in FIG. 6, if the flag is set to false (e.g., 0), then the most probable symbol is not encoded (606). If the flag is set to true (e.g., 1), then the most probable set is encoded (604). For example, coding the set with a most probable_flag considering only one most probable transform set.

In some embodiments, the available set symbol to code when the most probable flag is true is all the symbols in the set alphabet. In some embodiments, the available set symbol to code when the most probable flag is false is all of the symbols in the set alphabet minus the most probable set determined by the set context (e.g., mapping function or table context_to_probable_set).

In some embodiments, if the most probable flag is true and the set symbol to code is most probable, the set symbols is coded with the probably model that has highest possible probability for the set symbol. In some embodiments, if the most probable flag is false and the set symbol to code is less probable, the set symbols are coded with the probably model which has started from the uniform default probability.

In some embodiments, for coding one coding block or transform block, a set of one or multiple most probable transform sets are derived based on predefined coding context (e.g., intra prediction mode), and the when the most probable flag is true, the most probable set index is further signaled to indicate which one of the transform sets is selected. When most probable flag is false, a remaining_set_index is further signaled to indicate which one of the non-most-probable transform sets is selected. In some embodiments, the most probable flag is context coded using arithmetic coding.

In some embodiments, a secondary or primary transform set list is derived for each transform block. Previously parsed information may be used to order secondary or primary transform sets in the list. In one example, the most probable secondary or primary transform set is at the top of list. An index to the set may be signaled using bypass, Golomb or arithmetic coding. An offset may be further signaled to indicate kernel type using bypass, Golomb or arithmetic coding.

(A1) In one aspect, some embodiments include a method (e.g., the method 500) of video encoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes: (i) receiving video data comprising a plurality of blocks, including a first block (e.g., from the video source 104); (ii) determining a secondary transform kernel type value for the first block; (iii) transmitting a first syntax element in a video bitstream, the first syntax element indicating the secondary transform kernel type value; (iv) in accordance with a determination that the secondary transform kernel type has a first value (e.g., 1): (a) determining a secondary transform set identifier; (b) transmitting a second syntax element in the video bitstream, the second syntax element indicating the secondary transform set identifier; and (c) performing a secondary transform on the first block using the determined secondary transform kernel type and determined secondary transform set identifier; and (v) in accordance with a determination that the secondary transform kernel type has a second value (e.g., 0): (a) forgoing transmitting the second syntax element; and (b) forgoing performing the secondary transform on the first block (e.g., only a primary transform is performed).

(A2) In some embodiments of A1, the method further includes signaling the first block in the video bitstream. For example, transform coefficients from the secondary transform are signaled in the video bitstream. As an example, an output of the quantization 408 is signaled.

(A3) In some embodiments of A1 or A2, the method further includes: (i) determining a primary transform for the first block; and (ii) transmitting a third syntax element in the video bitstream, the third syntax element indicating the primary transform (e.g., the primary forward transform 404).

(A4) In some embodiments of any of A1-A3, the secondary transform is selected from a transform set based on the determined secondary transform set identifier.

(A5) In some embodiments of any of A1-A4, the method further includes jointly signaling the secondary transform kernel type with a primary transform kernel type.

(A6) In some embodiments of any of A1-A5, the method further includes jointly signaling the kernel set of the secondary transform in the video bitstream with a kernel set of the primary transform.

(A7) In some embodiments of any of A1-A6, the method further includes signaling a flag in the video bitstream, the flag indicating whether a primary and/or secondary transform is applied.

(A8) In some embodiments of any of A1-A7, the second syntax element is arithmetically coded.

(B1) In another aspect, some embodiments include a method (e.g., the method 550) of video decoding. In some embodiments, the method is performed at a computing system (e.g., the server system 112) having memory and control circuitry. In some embodiments, the method is performed at a coding module (e.g., the coding module 320). In some embodiments, the method is performed at a parser (e.g., the parser 254), a motion prediction component (e.g., the motion compensation prediction unit 260), and/or an intra prediction component (e.g., intra picture prediction unit 262). The method includes: (i) receiving video data (e.g., a coded video sequence) comprising a plurality of blocks, including a first block, and a first syntax element from a video bitstream (e.g., the video bitstream of A1); (ii) determining a secondary transform kernel type value for the first block based on the first syntax element; (iii) in accordance with a determination that the secondary transform kernel type has a first value (e.g., 1): (a) determining a secondary transform set identifier based on a second syntax element from the video bitstream; and (b) performing an inverse secondary transform (e.g., the inverse secondary transform 412) on the first block using the determined secondary transform kernel type and determined secondary transform set identifier; and (iv) in accordance with a determination that the secondary transform kernel type has a second value (e.g., 0), forgoing performing the inverse secondary transform on the first block. For example, a chosen transform set and/or a kernel type (within the set) is explicitly signaled by encoding a primary and/or secondary transform set ID and/or a secondary kernel type. In some embodiments, the kernel type is signaled first, then the transform set is signaled. As an example, signaling the kernel type may also signal whether the primary and/or secondary transform is used. In some embodiments, the inverse secondary transform corresponds to a secondary transform performed during encoding of the video data.

(B2) In some embodiments of B1, the second syntax element is not included in the video bitstream in accordance with the secondary transform kernel type having the second value. For example, if kernel type signals that the primary and/or secondary transform is disabled, the corresponding transform set ID is not signaled.

(B3) In some embodiments of B1 or B2, the method further includes determining a primary transform (and/or an inverse primary transform corresponding to the primary transform) for the first block based on a third syntax element from the video bitstream.

(B4) In some embodiments of B3, the primary transform is a non-separable transform. For example, the primary transform types include at least one non-separable transform.

(B5) In some embodiments of any of B1-B4, the secondary transform is a non-separable transform. For example, the secondary transform types include at least one non-separable transform.

(B6) In some embodiments of any of B1-B5, the secondary transform is selected from a transform set based on the determined secondary transform set identifier.

(B7) In some embodiments of B6, the transform set includes one or more primary-only transform types and one or more primary-and-secondary transform types. For example, the transform set may include a mixture of primary-only and primary-plus-secondary transform combination types.

(B8) In some embodiments of any of B1-B7, secondary transform kernel type is jointly signaled in the video bitstream with a primary transform kernel type. For example, the kernel type for primary transform and secondary transform are jointly signaled.

(B9) In some embodiments of any of B1-B8, the method further includes determining a kernel set for the secondary transform based on information from the video bitstream.

(B10) In some embodiments of B9, the kernel set of the secondary transform is jointly signaled in the video bitstream with a kernel set of the primary transform. For example, the kernel set for primary transform and secondary transform are jointly signaled.

(B11) In some embodiments of any of B1-B10: (i) a flag is signaled in the video bitstream, the flag indicating whether a primary and/or secondary transform is applied; and (ii) in accordance with the signaled flag having a first value, the secondary transform kernel type is signaled via the first syntax element. For example, a flag is first signaled to indicate whether a primary and/or secondary transform is applied. When this flag is signaled with a value indicating the primary and/or secondary transform is applied, the kernel type is further signaled to indicate which one of the transform kernels is used and this kernel type does not include an option of not applying the primary and/or secondary transform.

(B12) In some embodiments of any of B1-B11, the secondary transform set identifier is determined based on set context information. For example, the method of mapping set context to transform set ID can be derived from any possible coding context.

(B13) In some embodiments of B12, the set context information includes one or more of a previously coded mode, a primary transform type, a primary transform set identifier, a secondary transform type, a secondary transform set identifier, a coding block size, and a transform block size. For example, the coding context includes any possible combination of previously coded mode or combination of them, such as intra prediction mode, or primary transform type, or primary transform set ID, or secondary transform type, or secondary transform set ID, or coding block size, or transform block size. In some embodiments, a most probable set is derived from the set context information. For example, the most probable set is derived from the coding context, which is predefined and implemented in a mapping function or table.

(B14) In some embodiments of B12 or B13, a grouping of coding texts is predefined to form an index. For example, a grouping of coding texts is predefined to form an index for the mapping function or table context_to_probable_set.

(B15) In some embodiments of any of B1-B14, a set of transform kernel types for the secondary transform is identified based on a grouping of coding contexts. For example, the specific set of primary transform and secondary transform kernel types is designed or chosen from already available transform kernels, such that it works best (e.g., decorrelate best or best video compression efficiency) for a certain group of coding contexts. In some embodiments, for each predefined group of coding contexts, there is only one or a subgroup of transform set that can be applicable for the current block.

(B16) In some embodiments of any of B1-B15, the second syntax element is arithmetically coded. For example, the signaling of a set ID is performed by an arithmetic coding. In some embodiments, the default or initial probability model (e.g., a Cumulative Densify Function (CDF)) for arithmetic coding of a most probable secondary transform set ID is set as nearly 100% probability or as high allowed as possible in the video coding system. In some embodiments, the default or initial probability model (e.g., CDF) for arithmetic coding of a remaining less probable secondary transform set IDs is set as nearly 0% probability or as low allowed as possible in the video coding system. For example, the nearly 0) % probability is achieved by associating the minimum range value (e.g., 4) for the symbol representing one of these remaining less probable secondary transform set IDs. In some embodiments, the default probability model (e.g., CDF) is either adaptive or nonadaptive. In some embodiments, if the video coding system can choose adaptive or non-adaptive mode for the entropy coding of the set symbol, the system is configured to choose the non-adaptive mode, to spend the least possible number of bits to code the set symbol. In some embodiments, the second syntax element is Huffman coded. For example, the signaling of set ID can be performed by a variable length coding (VLC) or Huffman coding. In some embodiments, the codeword length of the most probable transform set is the shortest possible. In some embodiments, the codeword length of the less probable transform set is longer than that of most probable set.

(B17) In some embodiments of any of B1-B16, the method further including determining a most probable flag from the video bitstream, wherein the most probable flag indicates whether the set is most probable. For example, the signaling the secondary transform starts with a binary flag "most_probable_flag", which tells whether the set is most probable. As an example, the set may be coded with a most probable_flag considering only one most probable transform set. In some embodiments, the available set symbol to code when the most probable flag is true is all the symbols in the set alphabet. In some embodiments, the available set symbol to code when the most probable flag is false is all of the symbols in the set alphabet minus the most probable set determined by the set context (e.g., mapping function or table context_to_probable_set). In some embodiments, if most probable flag is true and the set symbol to code is most probable, the set symbols is coded with the probably model that has highest possible probability for the set symbol. In some embodiments, if most probable flag is false and the set symbol to code is less probable, the set symbols are coded with the probably model which has started from the uniform default probability. In some embodiments, for coding one coding block or transform block, a set of one or multiple most probable transform sets are derived based on pre-defined coding context (e.g., intra prediction mode), and the when the most probable flag is true, the most probable set index is further signaled to indicate which one of the transform sets is selected. When most probable flag is false, a remaining_set_index is further signaled to indicate which one of the non-most-probable transform sets is selected. In some embodiments, the most probable flag is context coded using arithmetic coding.

(B18) In some embodiments of any of B1-B17, a secondary transform set list is derived for each transform block. For example, a secondary or primary transform set list is derived for each transform block. Previously parsed information may be used to order secondary or primary transform sets in the list. As an example, the most probable secondary or primary transform set may be at the top of list. An index to the set can be signaled using bypass, Golomb or arithmetic coding. An offset can be further signaled to indicate kernel type using bypass, Golomb or arithmetic coding.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A8 and B1-B18 above). In yet another aspect, some embodiments include a non-transitory computer-readable storage medium storing one or more sets of instructions for execution by control circuitry of a computing system, the one or more sets of instructions including instructions for performing any of the methods described herein (e.g., A1-A8 and B1-B18 above).

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving video data comprising a plurality of blocks, including a first block, from a video bitstream; and when a primary transform kernel type for the first block is a two-dimensional discrete cosine transform (DCT-DCT) or a two-dimensional asymmetric discrete sine transform (ADST-ADST), determining a secondary transform kernel type for the first block based on a first syntax element from the video bitstream;

when the secondary transform kernel type has a first value:

entropy decoding a second syntax element from the video stream, the second syntax element corresponding to a secondary transform set identifier, wherein a context for entropy decoding the second syntax element is determined based on an intra prediction mode of the first block, and wherein the context is configured to apply a maximum range to a most probable set symbol;

determining the secondary transform set identifier from the second syntax element from the video bitstream; and performing an inverse secondary transform on the first block using the determined secondary transform kernel type and determined secondary transform set identifier, the inverse secondary transform corresponding to a secondary transform performed during encoding of the video data; and when the secondary transform kernel type has a second value, forgoing performing the inverse secondary transform on the first block.

2. The method of claim 1, wherein the second syntax element is not included in the video bitstream in accordance with the secondary transform kernel type having the second value.

3. The method of claim 1, further comprising determining a primary transform for the first block based on a third syntax element from the video bitstream.

4. The method of claim 3, wherein the primary transform is a non-separable transform.

5. The method of claim 1, wherein the secondary transform is a non-separable transform.

6. The method of claim 1, wherein the secondary transform is selected from a transform set based on the determined secondary transform set identifier.

7. The method of claim 6, wherein the transform set includes one or more primary-only transform types and one or more primary-and-secondary transform types.

8. The method of claim 1, wherein the secondary transform kernel type is jointly signaled in the video bitstream with the primary transform kernel type.

9. The method of claim 1, further comprising determining a kernel set for the secondary transform based on information from the video bitstream.

10. The method of claim 9, wherein the kernel set of the secondary transform is jointly signaled in the video bitstream with a kernel set of the primary transform.

11. The method of claim 1, wherein the second syntax element is entropy decoded based on the intra prediction mode of the first block and set context information that includes one or more of: a previously coded mode, a primary transform type, a primary transform set identifier, a secondary transform type, a secondary transform set identifier, a coding block size, and a transform block size.

12. The method of claim 1, wherein a set of transform kernel types for the secondary transform is identified based on a grouping of coding contexts.

13. The method of claim 1, further comprising determining a most probable flag from the video bitstream, wherein the most probable flag indicates whether a set is most probable.

14. The method of claim 1, wherein the first block comprises a plurality of transform blocks, and wherein a respective secondary transform set list is derived for each transform block in the plurality of transform blocks.

15. A method of video encoding performed at a computing system having memory and one or more processors, the method comprising:
- receiving video data comprising a plurality of blocks, including a first block;
- identifying a primary transform kernel type for the first block;
- when the primary transform kernel type for the first block is a two-dimensional discrete cosine transform (DCT-DCT) or a two-dimensional asymmetric discrete sine transform (ADST-ADST):
  - identifying a secondary transform kernel type and a secondary transform set identifier for the first block;
  - entropy encoding a syntax element indicating the secondary transform set identifier, wherein a context for entropy encoding the syntax element is determined based on an intra prediction mode of the first block, and wherein the context is configured to apply a maximum range to a most probable set symbol;
  - performing a secondary transform on the first block based on the secondary transform kernel type and secondary transform set identifier; and
  - transmitting the entropy-encoded syntax element in a video bitstream; and
- when the primary transform kernel type for the first block is a transform type other than DCT-DCT or ADST-ADST, forgoing performing the secondary transform on the first block.

16. The method of claim 15, wherein the primary transform kernel type corresponds to a non-separable transform.

17. The method of claim 15, wherein the secondary transform is a non-separable transform.

18. A method of generating a video bitstream, comprising:
- generating a video bitstream, including:
  - identifying a primary transform kernel type for a first block of video data;
  - when the primary transform kernel type for the first block is a two-dimensional discrete cosine transform (DCT-DCT) or a two-dimensional asymmetric discrete sine transform (ADST-ADST):
    - identifying a secondary transform kernel type and a secondary transform set identifier for the first block;
    - entropy encoding a syntax element indicating the secondary transform set identifier, wherein a context for entropy encoding the syntax element is determined based on an intra prediction mode of the first block, and wherein the context is configured to apply a maximum range to a most probable set symbol;
    - performing a secondary transform on the first block based on the secondary transform kernel type and secondary transform set identifier; and
    - transmitting the entropy-encoded syntax element in a video bitstream; and
  - when the primary transform kernel type for the first block is a transform type other than DCT-DCT or ADST-ADST, forgoing performing the secondary transform on the first block; and
- transmitting the video bitstream to a video decoding apparatus, wherein the video bitstream comprises the first entropy-encoded syntax element.

19. The method of claim 18, wherein the secondary transform is selected from a transform set that is identified by the secondary transform set identifier.

20. The method of claim 18, wherein a kernel set for the secondary transform is jointly signaled in the video bitstream with a kernel set for the primary transform.

* * * * *